United States Patent [19]

Yamamoto et al.

[11] Patent Number: 5,655,050

[45] Date of Patent: Aug. 5, 1997

[54] APPARATUS AND METHOD FOR RECORDING AND REPRODUCING DIGITAL SIGNAL IN SYNCHRONIZATION BLOCKS

[75] Inventors: Yoshiki Yamamoto, Neyagawa; Tetsuya Mizushima, Yawata; Akira Iketani, Higashiosaka; Yasunori Kawakami, Osaka; Chiyoko Matsumi, Suita, all of Japan

[73] Assignee: Matsushita Electric Industrial Co., Ltd., Osaka-fu, Japan

[21] Appl. No.: 659,623

[22] Filed: Jun. 6, 1996

Related U.S. Application Data

[63] Continuation of Ser. No. 207,193, Mar. 8, 1994, abandoned

[30] Foreign Application Priority Data

Mar. 10, 1993 [JP] Japan ................................. 5-049213

[51] Int. Cl.$^6$ ......................... H04N 5/76; G11B 5/09
[52] U.S. Cl. ..................... 386/104; 386/124; 360/48; 360/40
[58] Field of Search ..................... 358/335, 341, 358/342, 343, 310; 360/32, 39, 40, 48; H04N 5/76

[56] References Cited

U.S. PATENT DOCUMENTS

| | | | |
|---|---|---|---|
| 4,812,924 | 3/1989 | Fukami et al. | 360/32 |
| 4,916,548 | 4/1990 | Morioka et al. | 358/335 |
| 5,012,352 | 4/1991 | Yoshimura et al. | 358/343 |
| 5,060,077 | 10/1991 | Koya et al. | 358/335 |
| 5,182,678 | 1/1993 | Hatanaka et al. | 360/48 |

OTHER PUBLICATIONS

"*19-mm type D-1 cassette-tape-record*", Mar. 1986, SMPTE J. 95, 3.

"*The Composite Digital Format and its Application*", Oct. 1987, SMPTE J., 96, 10.

*Primary Examiner*—Khoi D. Truong
*Attorney, Agent, or Firm*—Greenblum & Bernstein P.L.C.

[57] ABSTRACT

A digital signal recording apparatus for recording digital signal in synchronization blocks includes a generator for generating a synchronization pattern for indicating the beginning of each synchronization block, a generator for generating an ID data for indicating the sequence of the synchronization blocks, a generator for generating an ID parity for checking the ID data, a generator for generating additional information signal, which is a track width data, a generator for generating audio and video signals. Above data are applied to a pattern generator for generating track data comprising plural consecutive normal synchronization blocks immediately preceded by two mini-synchronization blocks and immediately followed by one mini-synchronization block. Each mini-synchronization block includes the synchrionization pattern, ID data, ID parity, and additional information signal. Each normal synchronization block includes the synchronization pattern, ID data, ID parity, and audio and video signal.

10 Claims, 9 Drawing Sheets

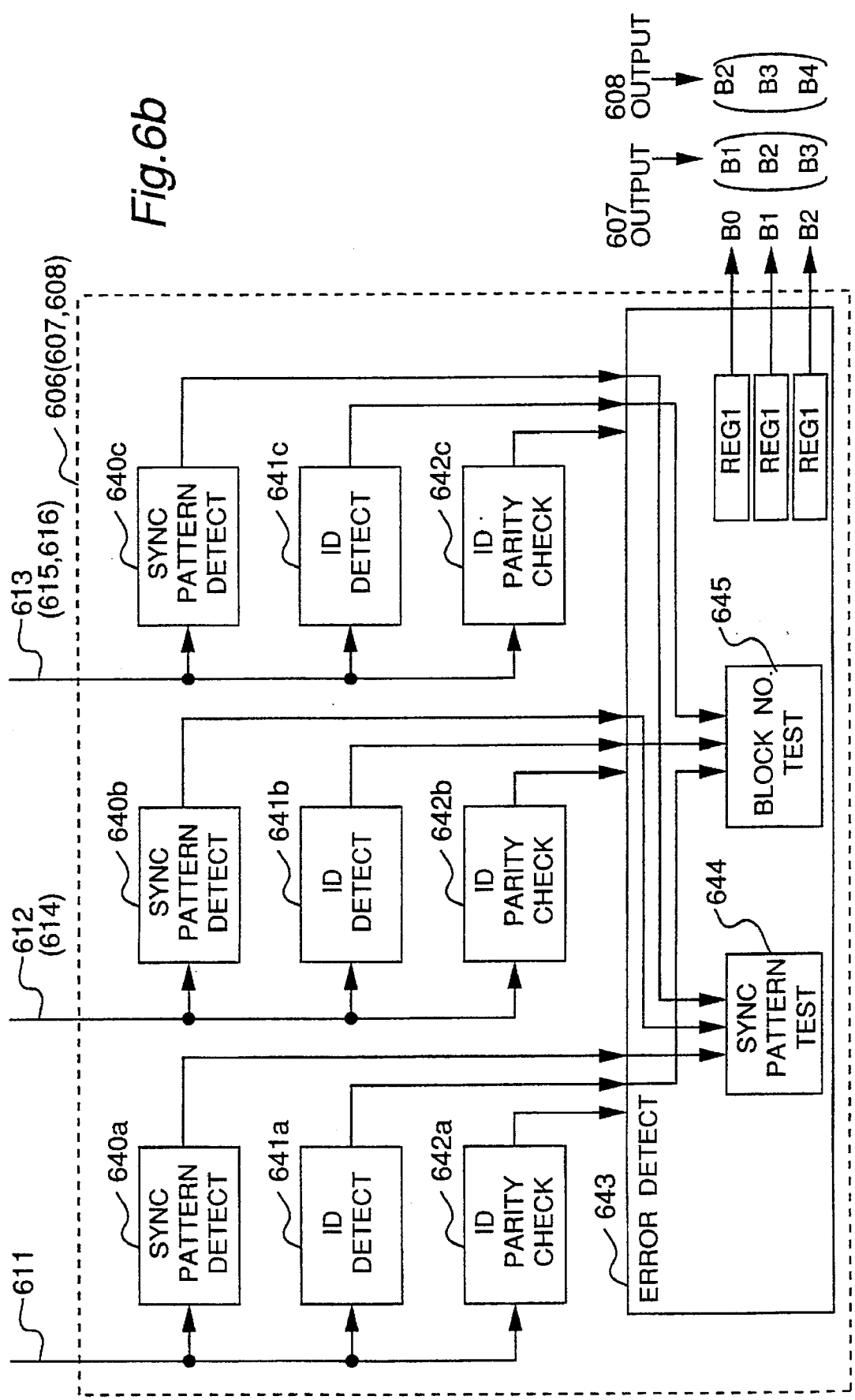

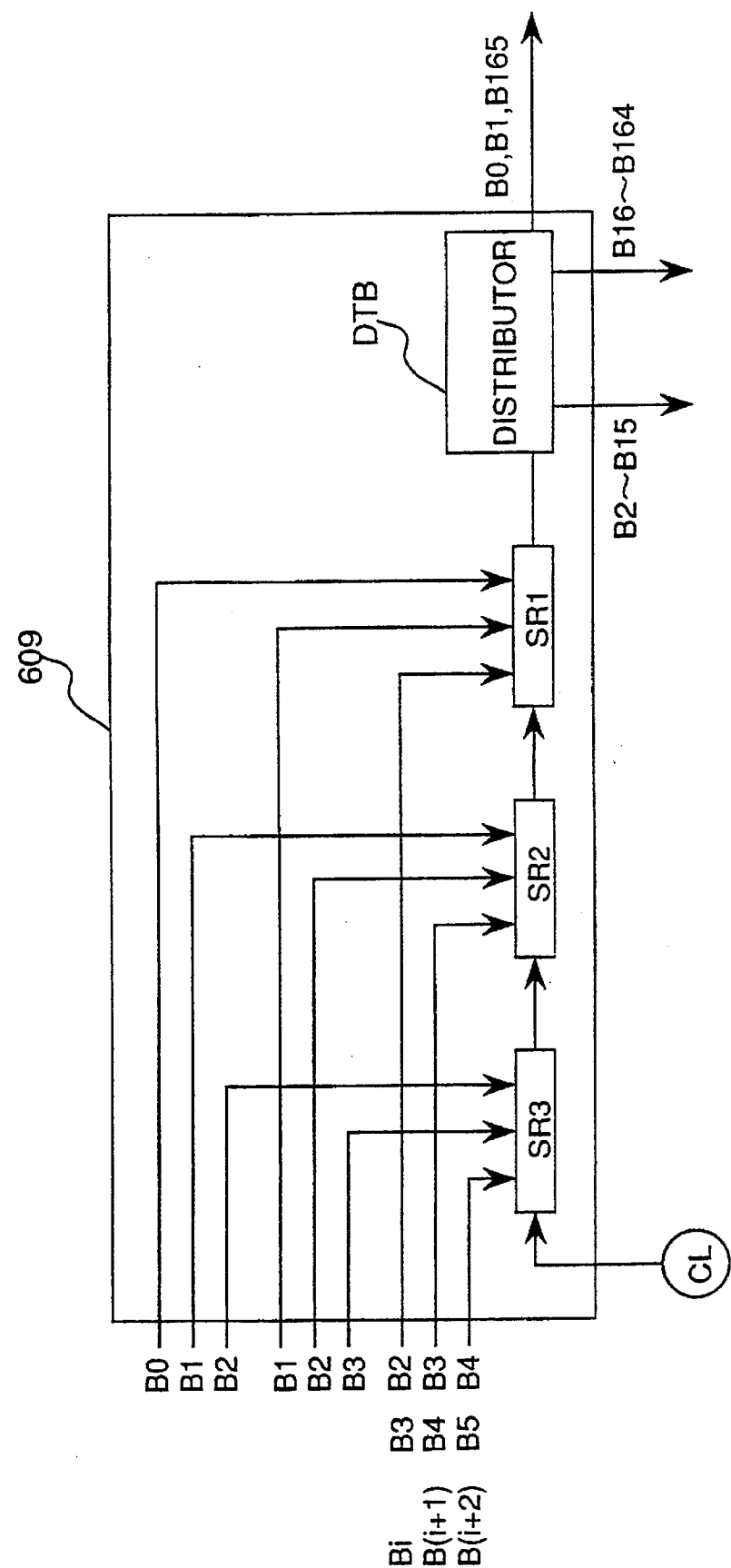

APPARATUS AND METHOD FOR RECORDING AND REPRODUCING DIGITAL SIGNAL IN SYNCHRONIZATION BLOCKS

This application is a continuation of application No. 08/207,193, filed Mar. 8, 1994, now abandoned.

BACKGROUND OF THE INVENTION

1. Field of the Invention

The present invention relates to a digital signal recording and reproducing apparatus for digitally recording and reproducing digital audio and video signals, and also methods therefor.

2. Description of the Prior Art

Recently, developments on the digital video recorder (digital VCR) has been made to record the video and audio signals in digital format which provides high quality and stable image in comparison to analog video recorder even after the tape dubbing or editing. Digital video recorders with rotational head of D1 and D2 types are now available for the business use, and the digital video recorders for the home use are now on the way by the recent technology development, such as image compression technology.

The digital video recorders for the home use has one problem in the density of the recording data per unit area of the tape. For the home use, the recording density on the tape should be set higher than those for the business use so that the home users will not be suffering from using many cassette tapes to record one program. Also the size of the cassette should be maintained at a reasonable size to enable them to be kept in cabinets in ordinary houses.

The increase of the amount of tape to record a program in home uses digital VCR will result in decrease of practical use. Therefore, for the home use digital VCR, a technology called high efficiency coding is used to remove the redundancy in the video signal and eventually reducing the amount of data for recording, thus reducing the amount of tape necessary to record a program. Furthermore, in the digital VCR, error correction codings, such as parity check codes, are added to the video and audio signals to correct errors during the data reproducing. Adding of the error correction codings results in increase of the data to be recorded. Therefore, the removal of the redundancy in the video signal is one of the most important tasks to enable the recording of inevitable data, such as the error correction codings.

The digital video recorder has been described in detail in a report "19-*mm type D-1 cassette-tape record*" March 1986, SMPTE J., 95,3 or in a report "*The Composite Digital Format and its Applications*" October 1987, SMPTE J., 96, 10.

In a conventional business use digital video recorder, a synchronization pattern, ID, and a 4-byte fixed pattern are recorded immediately before the signal recording area as a mini-synchronization block, and only the synchronization pattern and ID are recorded immediately after the signal area. When signal detection is in three synchronization block units, there are only two opportunities to detect the first synchronization block of the signal area when there is one mini-synchronization block immediately before the signal area. Compared with the second and subsequent synchronization blocks for which there are three detection opportunities, the fewer detection opportunities provided for the first synchronization block means there is a high probability that detection will not be possible. As a result, AV signals demodulated from the reproduced signal will be missing the audio or visual information contained in the undetected block, resulting in lower image or sound quality. In addition, the 4-byte fixed pattern data provides no meaningful information to the recorded data, and yet increases the amount of data that must be recorded.

This is particularly problematic in consumer digital VCRs due to the increased operating cost resulting from increased tape consumption, which also results in larger cassettes and creates additional cassette storage problems. It follows that increased tape consumption significantly impairs the practical commercial benefits of the digital VCR. This has led to the use of so-called bit-rate reduction technologies to reduce tape consumption by eliminating redundant components from the video signal and thereby reduce the amount of information recorded. To correct for errors during data reproduction in digital VCRs, an error correction code is added to the recorded audio and video signals. This error correction code, however, also increases the amount of recorded data, thus further increasing tape consumption. It is therefore essential to minimize data redundancy in the recorded signal in order to record the error correction code and other essential data and also prevent further increasing total tape consumption.

However, because the track width and other added information is small relative to the AV signal data, it is not possible to generate identical synchronization blocks. This makes it necessary to record the information to an area separate from the AV data. This, however, increases the amount of recorded information, and increases tape consumption.

Furthermore, to distinguish this added information from the AV signal area, the synchronization blocks must have a synchronization pattern different from that of the AV signal area, and separate dedicated circuits are required for playback processing. This further increases the circuit size and cost. These problems are major impediments to widespread acceptance of consumer digital VCRs.

SUMMARY OF THE INVENTION

Therefore, an object of the present invention is to obtain the same detection results with the first and last synchronization blocks as with the middle synchronization blocks in a digital signal recording apparatus.

To achieve this object, a digital signal recording apparatus according to the present invention adds two mini-synchronization blocks immediately before and one mini-synchronization block immediately after the signal area comprising plural consecutive synchronization blocks where said synchronization blocks comprise a synchronization pattern indicating the beginning of the digital data block, an ID indicating the sequence of the block, ID parity for detecting or correcting ID errors, and data, and said mini-synchronization blocks comprise said synchronization pattern, ID, ID parity, and additional data.

By means of this configuration, the first signal area synchronization block can be detected three times as are the center blocks in three synchronization block unit detection because there are two mini-synchronization blocks immediately before the first synchronization block of the signal area. By using a synchronization block cycle counter, it is also possible to detect the last synchronization block in the signal area with the same accuracy as the center blocks because one mini-synchronization block follows immediately after the last signal area synchronization block.

By also recording additional information such as the recording track width data to the mini-synchronization blocks, it is no longer necessary to provide an additional information area separate from the signal area, the need for a dedicated additional information area detection circuit is eliminated, and the circuit scale can be effectively contained.

As a result, the present invention provides significant practical benefit in digital VCRs, which are subject to a relatively high data error rate, digital media disks, and other digital recording media and devices.

BRIEF DESCRIPTION OF THE DRAWINGS

The present invention will become more fully understood from the detailed description given below and the accompanying diagrams wherein:

FIG. 6b is a block diagram showing a detail of each of the synchronization block detectors shown in FIG. 6a, FIG. 6c is a block diagram showing a detail of the synchronization block distributor.

DESCRIPTION OF PREFERRED EMBODIMENTS

Figure 1:
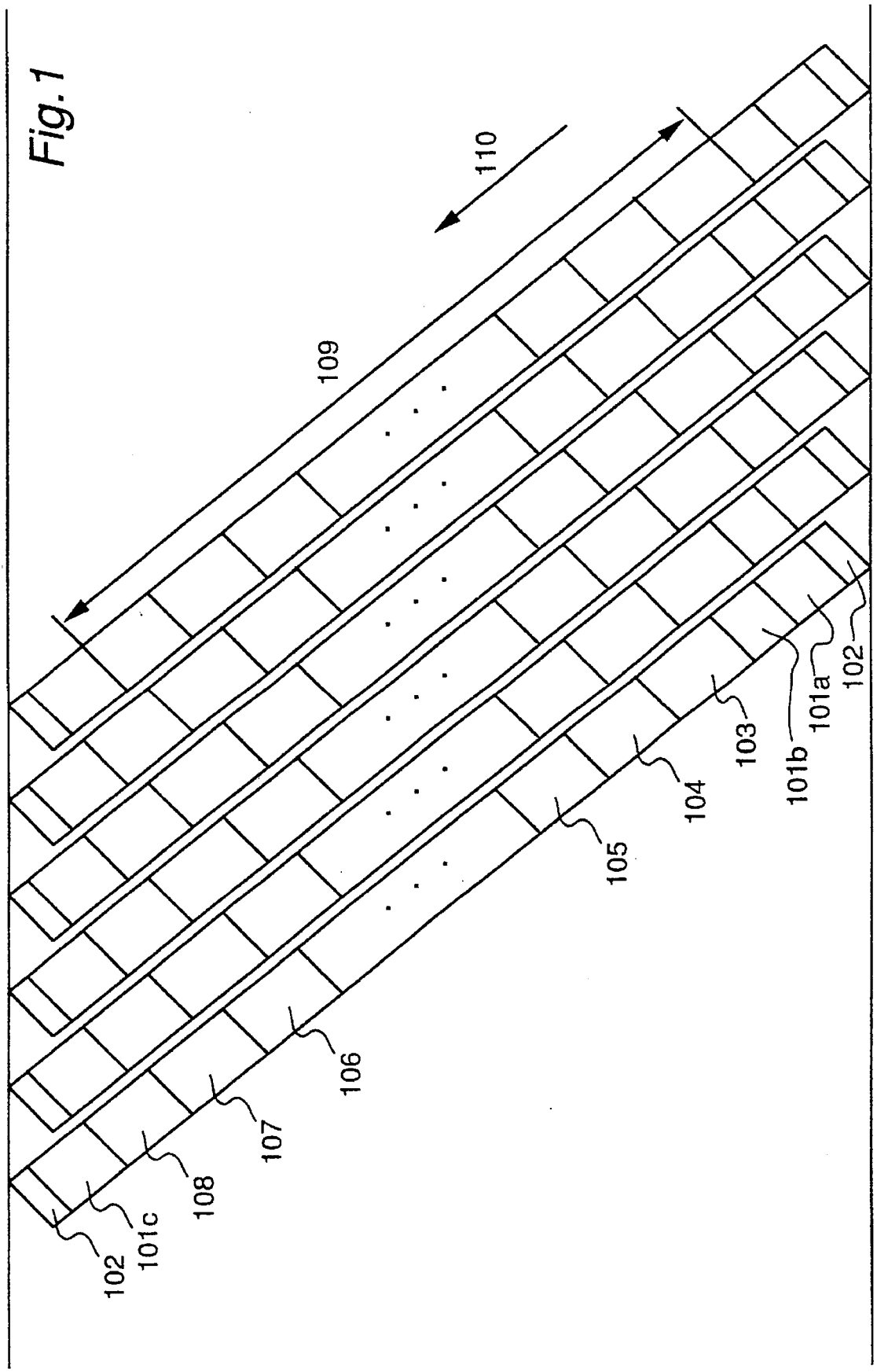
FIG. 1 is a diagram showing the track pattern in a digital signal recording apparatus according to the preferred embodiment of the present invention.

The preferred embodiment of a digital signal recording apparatus for recording digital signals according to the invention is described below with reference to the accompanying figures, of which FIG. 1 shows the track pattern of a digital signal recorded by the digital signal recording apparatus of the present invention, recorded in the direction of arrow 110.

The track pattern refers to the data stream recorded to tape by one trace of one head. As shown in FIG. 1, the track pattern comprises two mini-synchronization blocks 101a and 101b (generally referred to as 101) at the leading end portion of each track; normal synchronization blocks 103, 104, 105, ......, 106, 107, 108 carrying the audio and video signals; and one mini-synchronization block 101c at the trailing end portion of each track. The normal synchronization blocks 103, 104, 105, ......, 106, 107, 108 are located in an AV area 109.

Gap areas 102 at opposite ends of the track are for providing a mechanical margin preventing loss of the valid data following the mini-synchronization block 101 due to oscillation of the head cylinder. The direction of the head trace is indicated by arrow 110.

In a home use digital VCR according to the present invention, ten tracks are used for recording one frame of the video signal.

Figure 2:
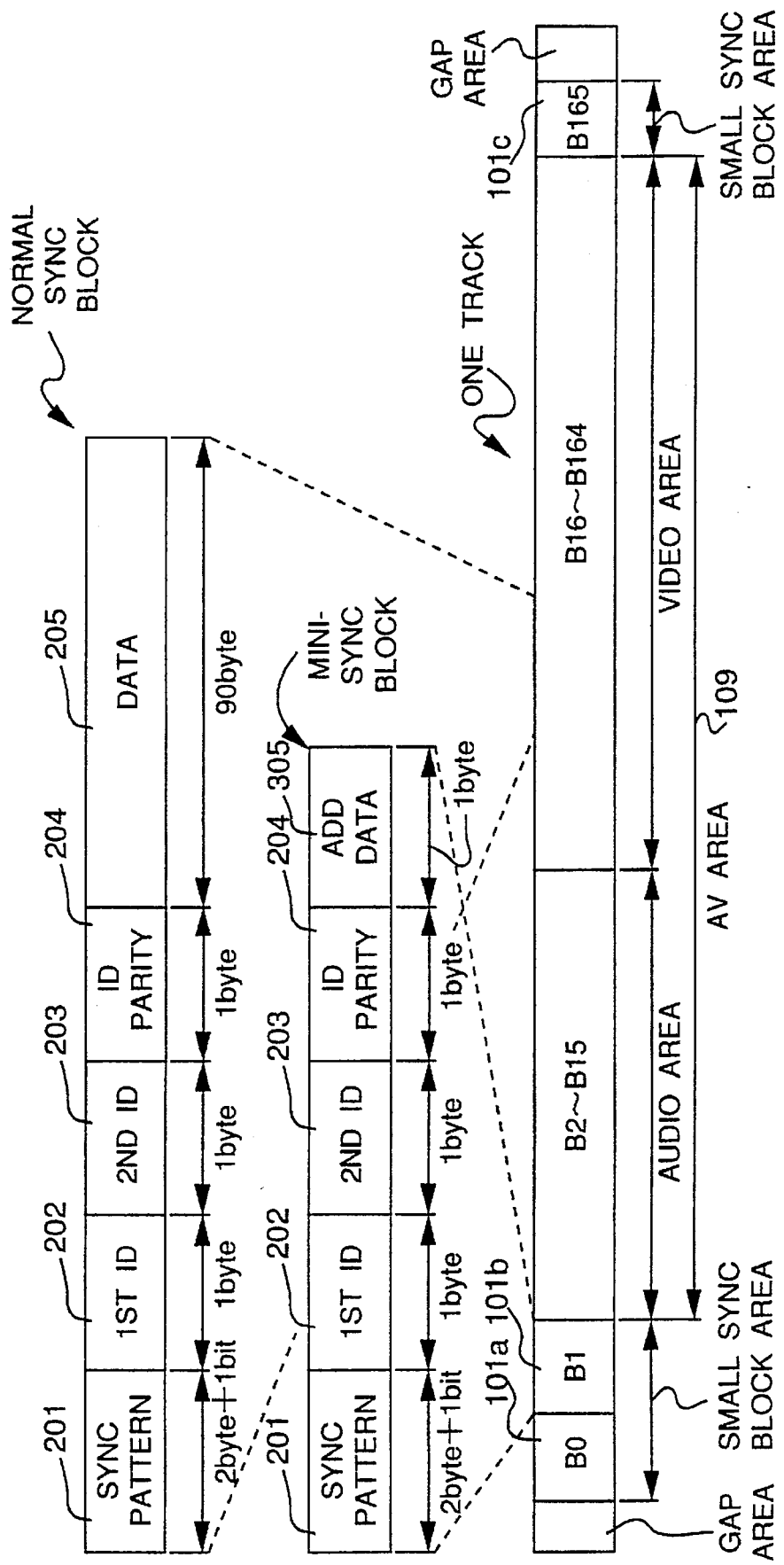
FIG. 2 is a diagram showing the synchronization block structure of the preferred embodiment.

Referring to FIG. 2, the structure of one normal synchronization block and one mini-synchronization block in a track is shown. The normal synchronization block includes synchronization pattern 201 which indicates the beginning of the data block. According to one example, the synchronization pattern 201 has a pattern (0001 1000 0000 0110 1) which is 2 bytes+1 bit (=17 bits) long. The first ID 202 (1 byte) indicates the frame and track number. The second ID 203 (1 byte) indicates the position of the information signal in the data, and the sequence of the synchronization block, i.e., the block number. The ID parity 204 (1 byte) is used for detecting and correcting the two IDs. The AV signal data 205 (90 bytes) is processed by a dedicated processor. Thus, the normal synchronization block is 761 bits long.

The structure of the mini-synchronization block 101 is shown in the second row in FIG. 2. The mini-synchronization block 101 has a similar structure to the normal synchronization block, but differs in that the AV signal data 205 in the normal synchronization block is replaced by additional data 305 (1 byte). According to one example, the additional data is the track width. The mini-synchronization block is 49 bits long.

As shown in FIG. 2, one track has two mini-synchronization blocks 101a and 101b with blocks numbers BO and BI, respectively, at the leading end of the AV area 109, and one mini-synchronization block 101c with block number B165 at the trailing end of the AV area 109. The normal synchronization blocks with block numbers B2–B15 are for carrying audio signal and the normal synchronization blocks with block numbers B16–B164 are for carrying video signal. As stated above, the block number is stored as the second ID 202. There are 14 audio signal synchronization blocks and 149 video signal synchronization blocks in the AV area 109 of one track. The second ID values (block numbers) 0, 1, and 165 are for the mini-synchronization blocks, second ID values (block numbers) 2–15 inclusive are for the audio signal, and second ID values (block numbers) 16–164 inclusive are for the video signal.

Figure 3:
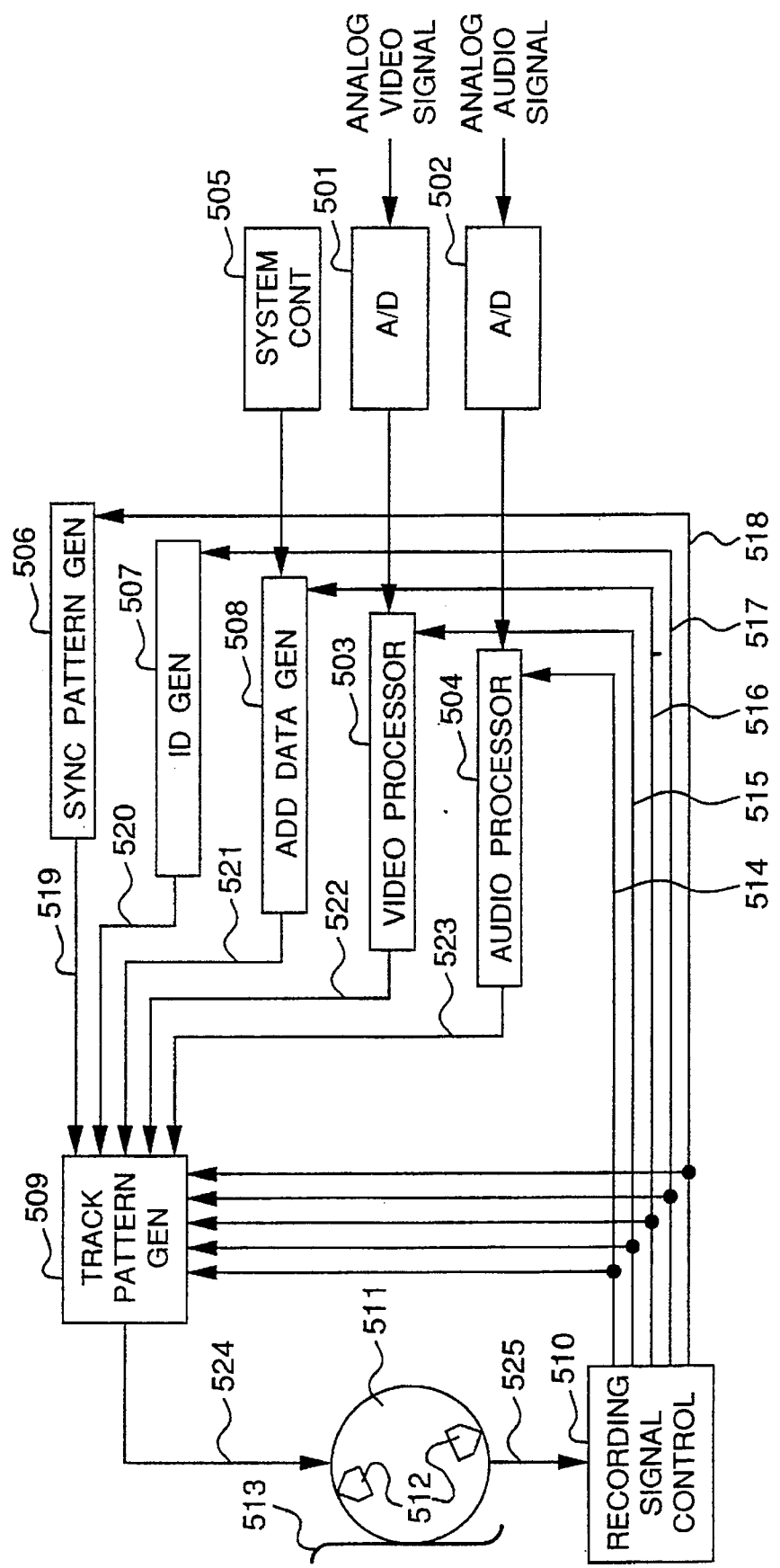
FIG. 3 is a block diagram of an apparatus for recording the synchronization block structure of the preferred embodiment.
Figure 4:
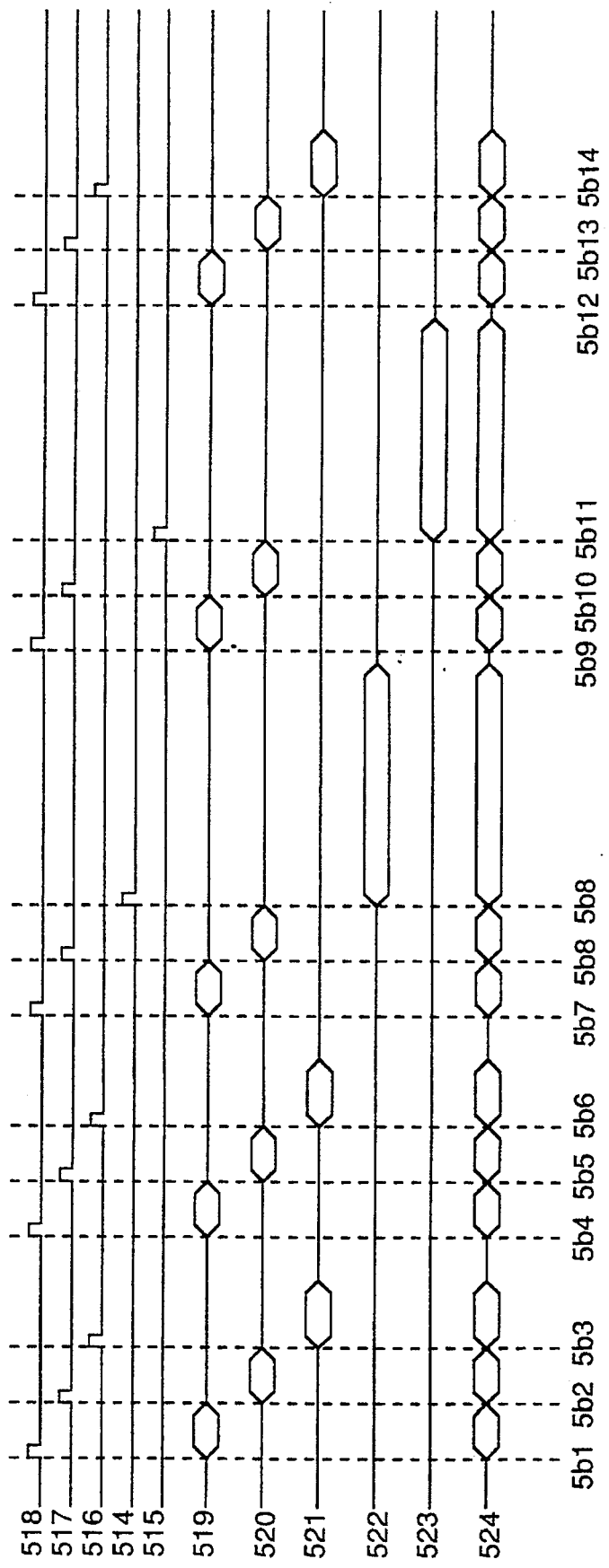
FIG. 4 is a timing chart of the recording apparatus of the preferred embodiment.

Referring to FIGS. 3 and 4, a block diagram and a recording timing chart of the digital signal recording apparatus according to the preferred embodiment are shown, respectively. The input analog video signal is converted to 8-bit digital data by a video signal A/D converter 501, and output to the video signal processor 503. The input analog audio signal is converted to 8-bit digital data by an audio signal A/D converter 502, and output to the audio signal processor 504.

The recording signal controller 510 outputs the signals 514–518 controlling the recorded signals based on the signal 525 output from cylinder 511 indicating where in the track the head is currently tracing. The video signal processor 503 applies specialized video signal processing, including shuffling, bit rate reduction, and error correction coding, and outputs the digital video signal 522 in a block generated based on the output 515 from the recording signal controller 510 at timing point 5b11 (FIG. 4). The audio signal processor 504 applies error correction coding and other audio signal processing, and outputs the digital audio signal 523 block generated based on the output 514 from the recording signal controller 510 at timing point 5b8.

The additional data processor 508 outputs the track width data and other additional data output from the system controller 505, which is typically a microprocessor, based on output 516 from the recording signal controller 510 at timing points 5b3, 5b6, and 5b14. The synchronization pattern generator 506 outputs the synchronization pattern 519 based on output 518 from the recording signal controller 510 at timing points 5b1, 5b4, 5b7, 5b9, and 5b12. The ID generator 507 outputs ID data 520 including the first ID containing the frame number and track number, the second ID expressing the block number, and ID parity for detecting and correcting errors in the first and second IDs at timing points 5b2, 5b5, 5b8, 5b10, and 5b13 based on output 517 from the recording signal controller 510.

The track pattern generator 509 selects one of signals 519, 520, 521, 522, and 523 in different time slots to generate the track pattern, which is shown in FIG. 2, and outputs signal 524. The signal is then recorded to the diagonal tracks shown in FIG. 1 on magnetic tape 513 by means of a head 512 mounted on cylinder 511, which is placed to rotate diagonally relative to the direction of travel of the magnetic tape 513.

One example of outputs 514–518 is shown in Table 1 below.

TABLE 1

| k = count value (k = 0, 1, 2, 3, . . .) | | Output signal |
|---|---|---|
| k = 500, k = 549 | | 514 = LOW |
| k = 598 + 761 * p | (0 ≦ p ≦ 163) | 515 = LOW |
| | | 516 = LOW |
| | | 517 = LOW |
| | | 518 = HIGH |
| k = 517, k = 566 | | 514 = LOW |
| k = 615 + 761 * p | | 515 = LOW |
| | | 516 = LOW |
| | | 517 = HIGH |
| | | 518 = LOW |
| k = 541, k = 590 | | 514 = LOW |
| | | 515 = LOW |
| | | 516 = HIGH |
| | | 517 = LOW |
| | | 518 = LOW |
| k = 639 + 761 * q | (0 ≦ q ≦ 13) | 514 = HIGH |
| | | 515 = LOW |
| | | 516 = LOW |
| | | 517 = LOW |
| | | 518 = LOW |
| k = 639 + 761 * q | (14 ≦ q ≦ 162) | 514 = LOW |
| | | 515 = HIGH |
| | | 516 = LOW |
| | | 517 = LOW |
| | | 518 = LOW |
| k = other than the above | | 514 = LOW |
| | | 515 = LOW |
| | | 516 = LOW |
| | | 517 = LOW |
| | | 518 = LOW |

Figure 5:
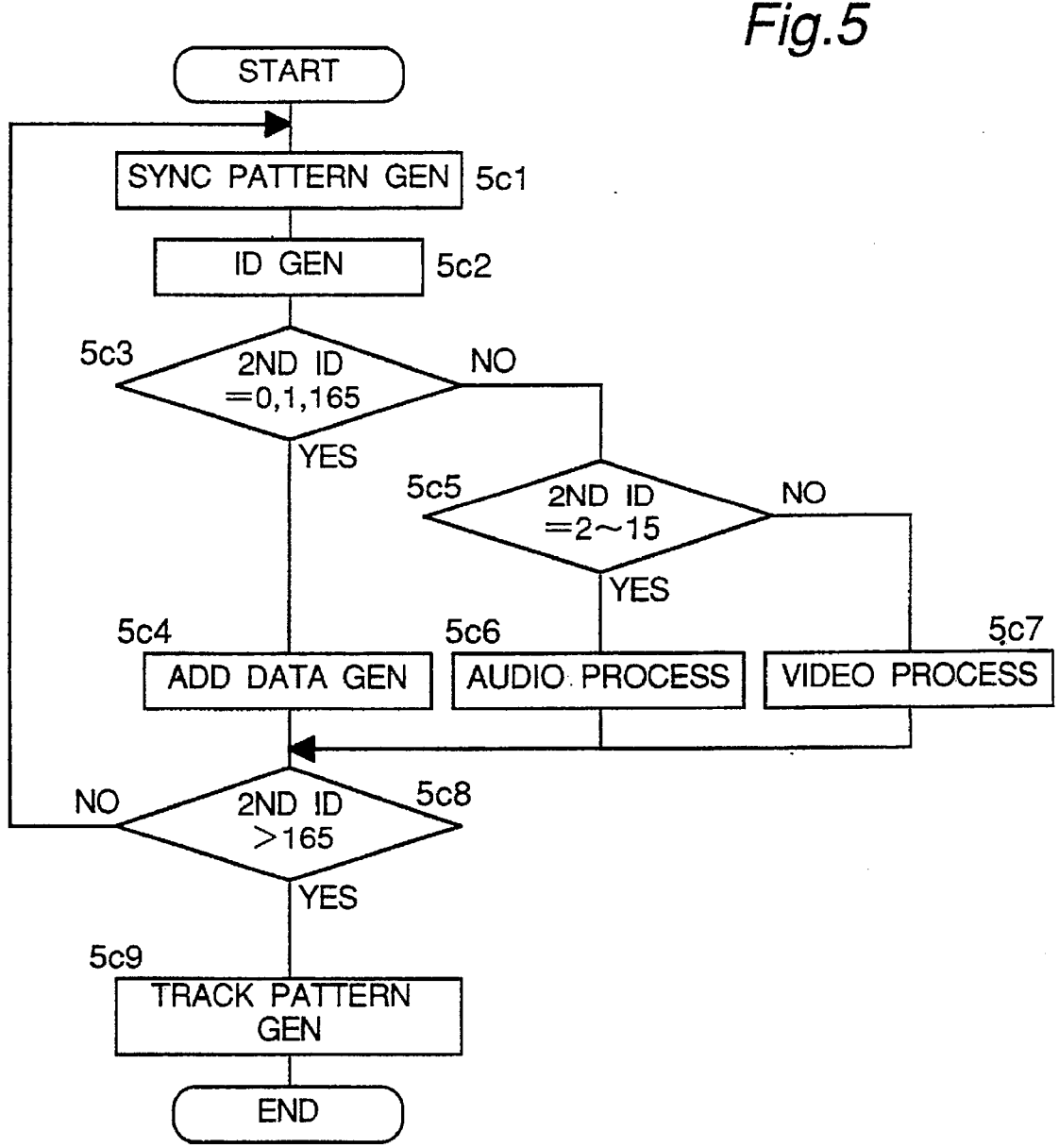
FIG. 5 is a flow chart of the operation of the recording apparatus of the preferred embodiment.

A flow chart of the operation of the invention is shown in FIG. 5. At step 5c1, the synchronization pattern generator 506 generates the synchronization pattern. At step 5c2, the ID generator 507 generates the first and second IDs and the ID parity data. At step 5c3, the second ID value is detected. If the second ID value, i.e., the block number, is any one of 0, 1, or 165, the procedure flows to step 5c4, otherwise the procedure flows to step 5c5. At step 5c4, the additional data generator 508 then generates the additional data.

At step 5c5, the second ID is again detected. If the second ID value is within the range 2≦15, the procedure flows to step 5c6 so that the audio signal processor 504 applies dedicated audio signal processing. If at step 5c5 the ID value is not within the range 2≦15, the procedure flows to step 5c7 so that the video signal processor 503 applies dedicated video signal processing.

At step 5c8 again the second ID is detected. If the second ID value is greater than 165, the process flows to step 5c9, and if not, the process returns to step 5c1. The track pattern generator 509 then generates the track pattern shown in FIG. 2.

Figure 6A:
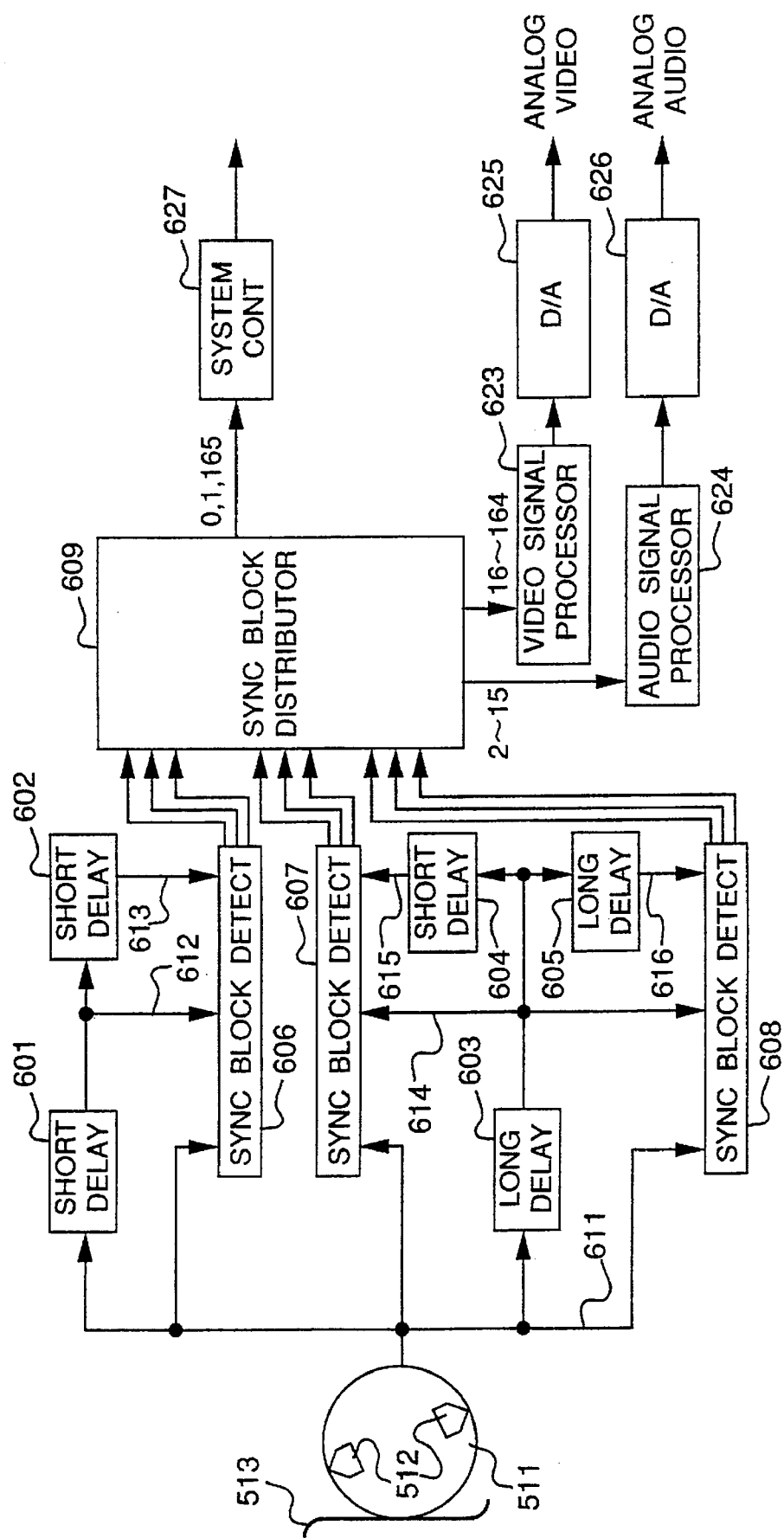
FIG. 6a is a block diagram of an apparatus for reproducing and detecting the synchronization blocks of the preferred embodiment.

Referring to FIG. 6a, a block diagram of the signal reproducing apparatus for reproducing data recorded by the above recording apparatus is shown. Signals are reproduced from the diagonal tracks shown in FIG. 1 on the magnetic tape 513 by the head 512 mounted on cylinder 511, which is placed to rotate diagonally relative to the direction of travel of the magnetic tape 513 to produce a reproduction signal 611. A short delay 601 delays the reproduction signal 611 one mini-synchronization block period, e.g., 49 bits, and outputs a 49 bit delay signal 612. A short delay 602 further delays the 49 bit delay signal 612 one mini-synchronization block period, e.g., 49 bits, and outputs a 98 bit delay signal 613.

A long delay 603 delays the reproduction signal 611 one synchronization block period, e.g. 761 bits, and outputs a 761 bit delay signal 614. A short delay 604 delays the 761 bit delay signal 614 one mini-synchronization block period (49 bits) and outputs a 810 bit delay signal 615. A long delay 605 delays the 761 bit delay signal 164 one synchronization block period (761 bits), and outputs a 1522 bit delay signal 616.

A first synchronization block detector 606 receives the direct reproduction signal 611, the 49 bit delay signal 612, and the 98 bit delay signal 613. Similarly, a second synchronization block detector 607 receives the direct reproduction signal 611, the 761 bit delay signal 614, and the 810 bit delay signal 615. Further, a third synchronization block detector 608 receives the direct reproduction signal 611, the 761 bit delay signal 614, and the 1522 bit delay signal 616.

The first, second and third synchronization block detectors have the same structure. The detail of the first synchronization block detector 606 is shown in FIG. 6b.

Referring to FIG. 6b, the first synchronization block detector 606 includes: three synchronization pattern detectors 640a, 640b and 640c connected to receive signals 611, 612 and 613, respectively; three ID detectors 641a, 641b and 641c connected to receive signals 611, 612 and 613, respectively; three ID parity check circuits 642a, 642b and 642c connected to receive signals 611, 612 and 613, respectively; and an error detector 643 connected for receiving the outputs of circuits 640a, 640b, 640c, 641a, 641b, 641c, 642a, 642b, 642c, and also for receiving signal 613.

The synchronization pattern detector 640a has a comparator and a memory. The comparator compares the received data with a predetermined synchronization pattern, e.g., (0001 1000 0000 0110 1) previously stored in the memory. When a synchronization pattern matching is detected, a pattern match flag is produced from the synchronization pattern detector 640a.

The ID detector 641a detects the track number and the frame number from the first ID 202, and the block number from the second ID 203. The detected track number, frame number and block number are applied to the error detector 643.

The ID parity check 642a carries out the parity check of the ID data.

The error detector 643 has a synchronization pattern tester 644, a block number tester 645, and three registers REG1, REG2 and REG3. In the error detector 643, when the following two conditions are met, it is so detected that the received three synchronization blocks are acceptable:

(i) at least one pattern match flag is received from any one of the three synchronization pattern detectors 640a, 640b and 640c; and (ii) at least two block numbers in the second ID as obtained from ID detectors 641a, 641b and 641c are mutually in correct relationship. For example, the second condition is met not only when three consecutive block numbers are successfully read as in (Bn, B(n+1), B(n+2)), wherein 0≦n≦162, but also when two block numbers are successfully read as in (X, B(n+1), B(n+2)), (Bn, X, B(n+2)) or (Bn, B(n+1), X), in which X represents unsuccessful to read. In the latter case, X can be replaced with correct block number in the block number tester 645.

First, in the case of the first synchronization block detector 606, since the first synchronization block detector 606 receives the direct reproduction signal 611, the 49 bit delay signal 612 and the 98 bit delay signal 613, the synchronization pattern detectors 640a, 640b and 640c will properly detect synchronization patterns when two mini-synchronization blocks 101a and 101b with block numbers B0 and B1 and one normal synchronization block 103 with block number B2 are transmitted parallelly to detectors 640a, 640b and 640c, respectively.

Then, the synchronization pattern tester 644 will receive three pattern match flags if all three synchronization patterns applied to the synchronization pattern detectors 640a, 640b and 640c are defectless. There will be a case in which the synchronization pattern data has some errors. The synchronization pattern tester 644 will produce a sync test clear signal when at least one pattern match flag is received. This synchronization pattern test corresponds to the above condition (i).

Also, the block number tester 645 will receive three block numbers B0, B1 and B2 from ID detectors 641a, 641b and 641c. Of course when the three block numbers has three sequential numbers, the block number tester 645 will produce a block number test clear signal. In addition when two of the three block numbers are proper, such as (X, B1, B2), (B0, X, B2) or (B0, B1, X), in which X represents unsuccessful to read, the block number tester 645 produces block number test clear signal, and at the same time replaces the error X with correct block number, for example, by the interpolation. This block number test corresponds to the above condition (ii). Other suitable corrections are given to the synchronization blocks, for example by the parity check.

When the sync test clear signal and the block number test clear signal are produced from blocks 644 and 645, respectively, the error detector 643 determined that the three received three synchronization blocks are acceptable. Thus, the received three blocks B0, B1 and B2 are transmitted and temporarily stored in registers REG1, REG2 and REG3, respectively, and are parallelly produced from error detector 643.

As apparent from the above in the first synchronization block detector 606, only the combination of the first three synchronization blocks B0, B1 and B2 in said order can be detected, because in other combinations the synchronization patterns can not be detected simultaneously at three synchronization pattern detectors.

Next, in the case of the second synchronization block detector 607, since the second synchronization block detector 607 receives the direct reproduction signal 611, the 761 bit delay signal 614 and the 810 bit delay signal 615, the synchronization pattern detectors 640a, 640b and 640c will properly detect synchronization patterns when one mini-synchronization blocks 101b with block number B1 and two normal synchronization blocks 103 and 104 with block number B2 and B3 are transmitted parallelly to detectors 640a, 640b and 640c, respectively.

Then, the synchronization pattern tester 644 and the block number tester 645 will carry out similar tests as described above to check conditions (i) and (ii). If these two conditions (i) and (ii) are met, the received three blocks B1, B2 and B3 are transmitted and temporarily stored in registers REG1, REG2 and REG3, respectively, and are parallelly produced from error detector 643.

As apparent from the above in the second synchronization block detector 607, only the combination of the second, third and fourth synchronization blocks B1, B2 and B3 in said order can be detected.

Further, in the case of the third synchronization block detector 608, since the third synchronization block detector 608 receives the direct reproduction signal 611, the 761 bit delay signal 614 and the 1522 bit delay signal 616, the synchronization pattern detectors 640a, 640b and 640c will properly detect synchronization patterns when three normal synchronization blocks, such as 103, 104 and 105 are transmitted parallelly to detectors 640a, 640b and 640c, respectively.

Then, the synchronization pattern tester 644 and the block number tester 645 will carry out similar tests as described above to check conditions (i) and (ii). If these two conditions (i) and (ii) are met, the received three blocks Bi, B(i+1) and B(i+2), in which 2≦i≦163, after suitable correction, are transmitted and temporarily stored in registers REG1, REG2 and REG3, respectively, and are parallelly produced from error detector 643 after each detection of the three blocks.

As apparent from the above in the third synchronization block detector 607, the combination of three normal synchronization blocks Bj, B(j+1) and B(j+2), in which 2≦j≦162, or the combination of the last three blocks, i.e., two normal synchronization blocks B163 and B164 and one mini-synchronization block B165 in said order can be detected.

In addition to the above, the error detector 643 further detects whether or not the three received frame numbers are identical, and also the three received track numbers are identical.

Referring back to FIG. 6a, the signal reproducing apparatus further includes synchronization block distributor 609, system controller 627, reproduced video signal processor 623, reproduced audio signal processor 624, video signal D/A converter 625, and audio signal D/A converter 626.

Referring to FIG. 6c, the synchronization block distributor 609 has three shift registers SR1, SR2 and SR3 and a distributor DTB. From the first synchronization block detector 606, the three lines from registers REG1, REG2 and REG3 are connected to three shift registers SR1, SR2 and SR3, respectively, to send the synchronization blocks B0, B1 and B2 to shift registers SR1, SR2 and SR3, respectively. After these three blocks B0, B1 and B2 are stored in shift registers SR1, SR2 and SR3, a clock pulse is added to the shift registers to send out the synchronization block B0 in the shift register SR1 to distributor DTB and, at the same time, to shift the data in shift registers SR2 and SR3 to shift registers SR1 and SR2, respectively.

From the second synchronization block detector 607, the three lines from registers REG1, REG2 and REG3 are connected to three shift registers SR1, SR2 and SR3, respectively, to send the synchronization blocks B1, B2 and B3 to shift registers SR1, SR2 and SR3, respectively. At a time when these blocks B1, B2 and B3 are sent to shift registers SR1, SR2 and SR3, the data in shift registers SR1, SR2 and SR3 are block B1, block B2 and empty, respective. Thus, the data in shift registers SR1 and SR2 remains the same, and the data in shift register SR3 in renewed with block B3. After these three blocks B1, B2 and B3 are stored in shift registers SR1, SR2 and SR3, a clock pulse is added to the shift registers to send out the synchronization block B1 in the shift register SR1 to distributor DTB and, at the same time, to shift the data in shift registers SR2 and SR3 to shift registers SR1 and SR2, respectively.

Similarly, from the third synchronization block detector 608, the three lines from registers REG1, REG2 and REG3 are connected to three shift registers SR1, SR2 and SR3, respectively, to send the synchronization blocks Bi, B(i+1) and B(i+2) to shift registers SR1, SR2 and SR3, respectively. At a time when these blocks Bi, B(i+1) and B(i+2) are sent to shift registers SR1, SR2 and SR3, the data in shift registers SR1, SR2 and SR3 are block Bi, block B(i+1) and (B(i+2), respective. Thus, the data in any of the shift registers SR1, SR2 and SR3 are applied with the same data. In other words, according to the present invention, there are three chances to fill in the normal synchronization block in the shift registers. If the normal synchronization block is successfully applied to the shifter registers in one of the three chances, the data in said normal synchronization block can be used as valid data even when the same normal synchronization block did not reach the shift registers in the remaining two chances.

The distributor DTB distributes the produced synchronization blocks to either one of blocks 627, 623 or 624 depending on the block number. When the block number is any one of B0, B1, B165 representing the mini-synchronization blocks, the mini-synchronization block is transmitted to the system controller 627. When the block number is between B2 and B15 both inclusive, the normal synchronization block is transmitted to the audio signal processor 624 in which error correction and other processing are made to the received synchronization blocks. When the block number is between B16 and B164 both inclusive, the normal synchronization block is transmitted to the video signal processor 623 in which error correction and other processing are made to the received synchronization blocks.

The video signal D/A converter 625 converts the digital video signal to an analog signal. The audio signal D/A converter 626 converts the digital audio signal to an analog signal.

Figure 7:
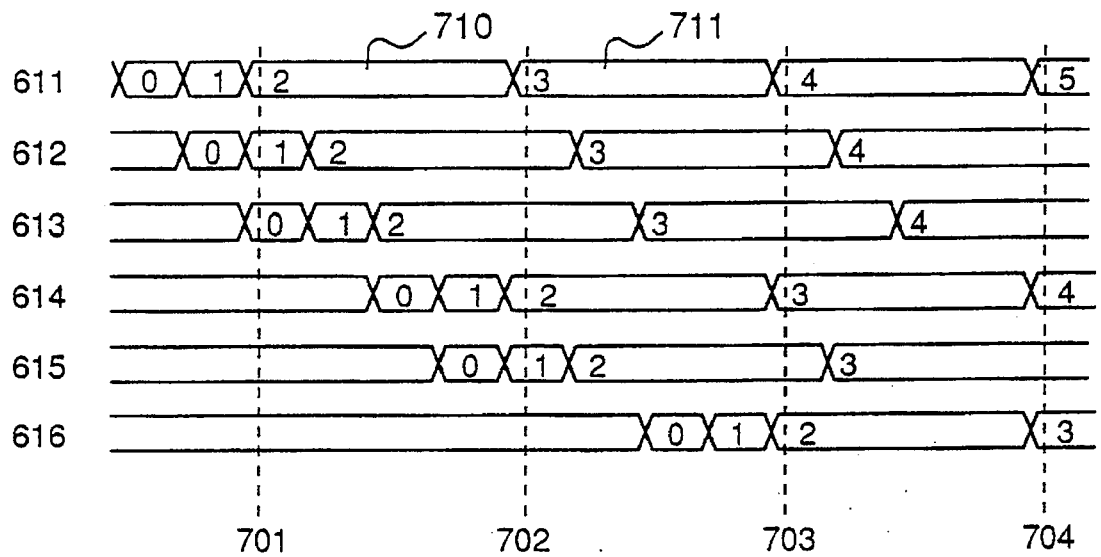
FIG. 7 is a timing chart describing the operation of the circuit of FIG. 6a when there are no errors in the reproduced synchronization blocks.

The wave forms and detection timing of signals 611–616 are shown in FIG. 7. The numbers in the signal wave forms are the block numbers, i.e., the values of the second IDs described above. Because synchronization pattern, ID, and ID parity blocks are recorded to the beginning of the synchronization block, synchronization block detection is executed at the beginning of each synchronization block.

At timing point 701 (FIG. 7), synchronization blocks B0, B1 and B2 can only be detected from the three signals 611, 612, 613. Thus, the combination of the first three synchronization blocks is therefore detected by the first synchronization block detector 606. Then, immediately after the timing point 701, the synchronization blocks B0, B1 and B2 are simultaneously shifted to the shift registers SR1, Sr2 and SR3.

At timing point 702, synchronization blocks B1, B2 and B3 can only be detected from the three signals 611, 614 615. Thus, the combination of these three synchronization blocks is therefore detected by the second synchronization block detector 607. Then, immediately after the timing point 702, the synchronization blocks B1, B2 and B3 are simultaneously shifted to the shift registers SR1, SR2 and SR3.

At timing point 703, synchronization blocks Bn, B(n+1) and B(n+2), wherein $2 \leq n \leq 163$, can only be detected from the three signals 611, 614, 616. Thus, the combination of these three synchronization blocks is therefore detected by the third synchronization block detector 608. Then, immediately after each of the timing point 702 et seq, the synchronization blocks Bn, B(n+1) and B(n+2) are simultaneously shifted to the shift registers SR1, SR2 and SR3.

By the signal recording and reproducing apparatus of the present invention, as shown in FIG. 7, the first normal synchronization block B2 (710 in FIG. 7) is detected three times at timing points 701, 702 and 703, and has three chances to be stored at shift registers. The same can be said to the other normal synchronization blocks following the block 710.

Figure 8:
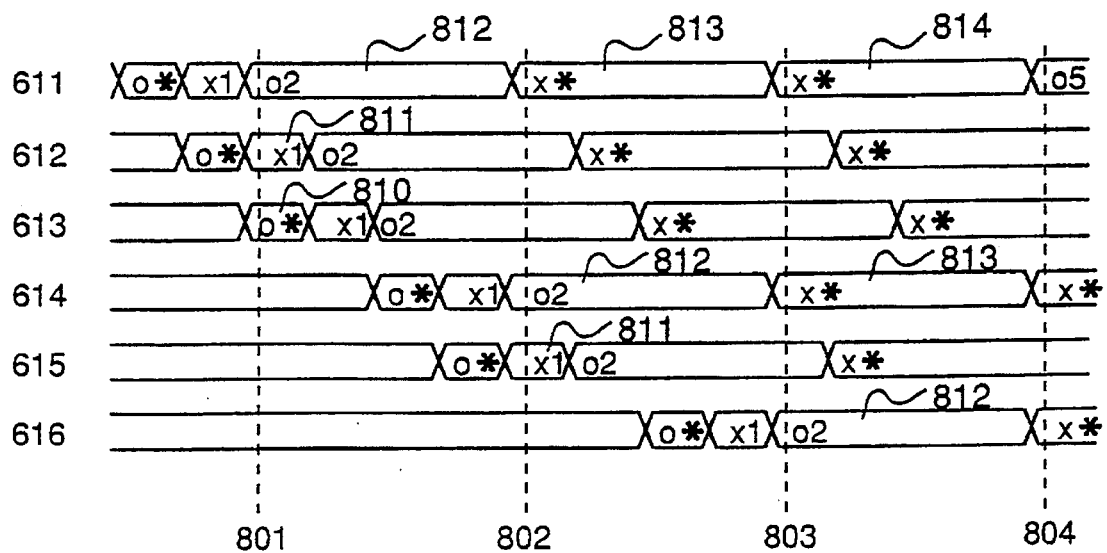
FIG. 8 is a timing chart describing the operation of the circuit of FIG. 6a when there are errors in the reproduced synchronization blocks.

Referring to FIG. 8, operation when errors are contained in the reproduced signal is described. In FIG. 8, the wave forms and detection timing of signals 611–616 are shown. The numbers in the signal wave forms are the values of the second IDs described above, "o" in front of the block number indicates synchronization block of which the synchronization pattern could be detected, "x" indicates synchronization block of which the synchronization pattern could not be detected, and "*" indicates synchronization block of which the second ID, i.e., the block number, could not be detected. Note that the timing shown in FIG. 8 is the same as that shown in FIG. 7.

In synchronization block 810, the synchronization pattern is detectable but the ID is undetectable. In synchronization block 811, the synchronization pattern is undetectable but the block number is detectable. In synchronization block 812, both the synchronization pattern and the block number are detectable. In synchronization blocks 813 and 814, both the synchronization pattern and block number are undetectable.

At timing point 801 it is possible to detect a total of two synchronization patterns and two blocks numbers from synchronization blocks 810, 811, and 812, accomplishing the above two conditions (i) and (ii). Thus, it is therefore possible to detect the three synchronization blocks 810, 811, and 812. As a result, even if the synchronization pattern and block number cannot be detected for the following two synchronization blocks 813 and 814, the presence of the two mini-synchronization blocks 810 and 811 immediately before the first synchronization block 812 in the valid data area makes it possible to detect this first synchronization block 812. While there are only one or two opportunities to detect the mini-synchronization blocks, writing these blocks to plural tracks effectively increases detection opportunities.

In other words, at timing point 802, since the above two conditions (i) and (ii) are met, it is possible to detect The three blocks. But at timing point 803, since only one block number is detected, the third synchronization block detector 608 fails to detect the three synchronization blocks. However, if the missing synchronization block is added in one of two other chances, there will be no skip of the synchronization block.

In addition, while synchronization block 108 in FIG. 1 can only be detected twice, and is therefore detected fewer times than the other synchronization blocks, its location at the end of the signal area enables detection with the same probability as the other synchronization blocks by using the periodicity of the synchronization block detection timing.

An area for recording additional data 305 at the end of the mini-synchronization blocks is also provided by the preferred embodiment of the invention. This data area records track width discrimination data, and other information. The track width can be specified by recording, for example, 00000000 for a track width of 10 μm, or 11111111 for a track width of 5 μm. As a result, it is not necessary to provide a special area for this additional information separately to the AV data area, the additional information can be detected by the AV area detection circuit, and the circuit (device) size can thus be reduced.

It is to be noted that while the present embodiment has been described with reference to audio and video data, the invention shall not be so limited and can be applied in digital signal recording apparatuses recording all types of digital signals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital signal recording apparatus for recording a digital signal in synchronization blocks, comprising:
    means for controlling said digital signal recording apparatus;
    means for generating a synchronization pattern for indicating a beginning of each synchronization block;
    means for generating ID data, comprising a first ID representing a frame and track number of a synchronization block and a second ID representing a sequence of the synchronization blocks;
    means for generating an ID parity for checking said ID data;
    means for generating an additional information signal in accordance with a first predetermined value of said second ID;
    means for generating a main information signal in accordance with a second predetermined value of said second ID, said means for generating a main information signal comprising means for processing an audio signal in accordance with a first timing signal output by said controlling means, and means for processing a video signal in accordance with a second timing signal output by said controlling means; and
    means for generating one track data comprising plural consecutive normal synchronization blocks immediately preceded by two mini-synchronization blocks and immediately followed by one mini-synchronization block, each mini-synchronization block comprising said synchronization pattern, said ID data, said ID parity, and said additional information signal, each normal synchronization block comprising said synchronization pattern, said ID pattern, said ID data, said ID parity, and said main information signal.

2. A digital signal recording apparatus as claimed in claim 1, wherein said additional information is track width information.

3. The digital signal recording apparatus as claimed in claim 1, said normal synchronization blocks immediately followed by no more than one mini-synchronization block.

4. The digital signal recording apparatus of claim 1, wherein said main information signal is audio/video signal data.

5. A digital signal recording method for recording a digital signal in synchronization blocks using a recording apparatus having a controller, an audio processor, and a video processor, comprising the steps of:
    (a) generating a synchronization pattern for indicating a beginning of each synchronization block;
    (b) generating ID data comprising a first ID representing a frame and track number of a synchronization block and a second ID representing a sequence of the synchronization blocks;
    (c) generating an ID parity for checking said ID data;
    (d) generating an additional information signal in accordance with a first predetermined value of the second ID;
    (e) generating a main information signal in accordance with a second predetermined value of the second ID, said main information signal having an audio component generated by said audio processor at a first predetermined time based on an output of said controller, and a video component generated by said video processor at a second predetermined time based on an output of said controller; and
    (f) generating one track data comprising plural consecutive normal synchronization blocks immediately preceded by two mini-synchronization blocks and immediately followed by one mini-synchronization block, each mini-synchronization block comprising said synchronization pattern, said ID data, said ID parity, and said additional information signal, and each normal synchronization block comprising said synchronization pattern, said ID data, said ID parity, and said main information signal.

6. The digital signal recording method as claimed in claim 5, said normal synchronization blocks immediately followed by no more than one mini-synchronization block.

7. The digital signal recording method as claim in claim 5, wherein said additional information is track width information.

8. The digital signal recording method of claim 5, wherein said main information is audio/video signal data.

9. A digital signal reproducing apparatus for reproducing digital signal in plural tracks each track data comprising plural consecutive normal synchronization blocks immediately preceded by two mini-synchronization blocks and immediately followed by one mini-synchronization block, said apparatus comprising:
    means for delaying said track data by a period equal to two mini-synchronization blocks to produce a double short period delay track signal;
    means for delaying said track data by a period equal to one mini-synchronization block to produce a single short period delay track signal;
    means for receiving in parallel direct track signal, said double short period delay track signal and said single short period delay track signal for detecting said two mini-synchronization blocks followed by one normal synchronization block;
    means for delaying said track data by a period equal to one mini-synchronization block and one normal synchronization block to produce a short plus long period delay track signal;
    means for delaying said track data by a period equal to one normal synchronization block to produce a single long period delay track signal;
    means for receiving in parallel direct track signal said short plus long period delay track signal and said single long period delay track signal for detecting said one mini-synchronization blocks followed by two normal synchronization blocks;
    means for delaying said track data by a period equal to two normal synchronization blocks to produce a double long period delay track signal; and
    means for receiving in parallel direct track signal, said double long period delay track signal and said single long period delay track signal for detecting three consecutive normal synchronization blocks.

10. A digital signal reproducing method for reproducing digital signal in plural tracks each track data comprising plural consecutive normal synchronization blocks immediately preceded by two mini-synchronization blocks and immediately followed by one mini-synchronization block, said method comprising the steps of:

(a) delaying said track data by a period equal to two mini-synchronization blocks to produce a double short period delay track signal;

(b) delaying said track data by a period equal to one mini-synchronization block to produce a single short period delay track signal;

(c) receiving in parallel direct track signal, said double short period delay track signal and said single short period delay track signal for detecting said two mini-synchronization blocks followed by one normal synchronization block;

(d) delaying said track data by a period equal to one mini-synchronization block and one normal synchronization block to produce a short plus long period delay track signal;

(e) delaying said track data by a period equal to one normal synchronization block to produce a single long period delay track signal;

(f) receiving in parallel direct track signal, said short plus long period delay track signal and said single long period delay track signal for detecting said one mini-synchronization blocks followed by two normal synchronization blocks;

(g) delaying said track data by a period equal to two normal synchronization blocks to produce a double long period delay track signal; and (h) receiving in parallel direct track signal, said double long period delay track signal and said single long period delay track signal for detecting three consecutive normal synchronization blocks.

* * * * *